United States Patent
Götz et al.

(10) Patent No.: US 11,258,692 B2
(45) Date of Patent: Feb. 22, 2022

(54) CONTROL METHOD, DEVICE, COMPUTER PROGRAM, COMPUTER READABLE MEDIUM AND METHOD FOR DATA COMMUNICATION IN AN INDUSTRIAL NETWORK

(71) Applicant: Siemens Aktiengesellschaft, Munich (DE)

(72) Inventors: Franz-Josef Götz, Heideck (DE); Marcel Kießling, Bayern (DE); Jürgen Schmitt, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/965,194

(22) PCT Filed: Jan. 22, 2019

(86) PCT No.: PCT/EP2019/051504
§ 371 (c)(1),
(2) Date: Jul. 27, 2020

(87) PCT Pub. No.: WO2019/149577
PCT Pub. Date: Aug. 8, 2019

(65) Prior Publication Data
US 2021/0067571 A1    Mar. 4, 2021

(30) Foreign Application Priority Data

Jan. 31, 2018 (EP) .................................. 18154319
Jul. 2, 2018 (EP) .................................. 18181209

(51) Int. Cl.
*G06F 15/16* (2006.01)
*H04L 43/10* (2022.01)
(Continued)

(52) U.S. Cl.
CPC .......... *H04L 43/10* (2013.01); *G05B 19/4185* (2013.01); *H04L 12/40* (2013.01);
(Continued)

(58) Field of Classification Search
None
See application file for complete search history.

(56) References Cited

U.S. PATENT DOCUMENTS

2003/0235184 A1* 12/2003 Dorenbosch .......... H04L 65/103
370/352
2009/0049175 A1* 2/2009 Finn ...................... H04L 12/462
709/226

(Continued)

OTHER PUBLICATIONS

PCT International Search Report and Written Opinion of International Searching Authority dated Mar. 20, 2019 based on PCT/EP2019/051504 filed Jan. 22, 2019.
(Continued)

*Primary Examiner* — Phyllis A Book
(74) *Attorney, Agent, or Firm* — Cozen O'Connor

(57) ABSTRACT

A control method, device, computer program, computer-readable medium and method for data communication in an industrial network that includes at least one node point, via a stream, in which resources are reserved on the at least one node point for data transmission between subscribers via the node point, using a reservation protocol, and data is transmitted via the stream, and a data frame is sent from the transmitter to transmit data from a transmitter to receivers, the data frame being formed from a plurality of data subrecords determined for different receivers, and on at least one output port of at least one node point, at least one data subrecord is filtered out of the data frame, and/or data is transmitted from a plurality of transmitters to a receiver via data frames that have a plurality of data subrecords originating from different emitters, on at least one node point.

19 Claims, 5 Drawing Sheets

(51) Int. Cl.

| | |
|---|---|
| *H04L 67/12* | (2022.01) |
| *H04L 43/0852* | (2022.01) |
| *H04L 43/026* | (2022.01) |
| *H04L 65/80* | (2022.01) |
| *H04L 65/65* | (2022.01) |
| *G05B 19/418* | (2006.01) |
| *H04L 65/61* | (2022.01) |
| *H04L 12/40* | (2006.01) |
| *H04L 47/76* | (2022.01) |
| *H04L 65/1093* | (2022.01) |

(52) U.S. Cl.
CPC ........ *H04L 43/026* (2013.01); *H04L 43/0858* (2013.01); *H04L 47/76* (2013.01); *H04L 65/1093* (2013.01); *H04L 65/4069* (2013.01); *H04L 65/608* (2013.01); *H04L 65/80* (2013.01); *H04L 67/12* (2013.01)

(56) References Cited

U.S. PATENT DOCUMENTS

| | | | |
|---|---|---|---|
| 2012/0236870 A1* | 9/2012 | Klein | H04L 45/66 370/401 |
| 2012/0243557 A1* | 9/2012 | Stanton | H04L 47/56 370/468 |
| 2012/0314597 A1* | 12/2012 | Singh | H04L 65/80 370/252 |
| 2016/0191597 A1* | 6/2016 | Joy | H04L 65/80 709/231 |
| 2017/0331719 A1 | 11/2017 | Park et al. | |
| 2019/0386935 A1* | 12/2019 | Back | H04L 49/901 |

OTHER PUBLICATIONS

Anonymous:"PROFINET System Description",PROFIBUS Nutzerorganisation e.V.; pps. Frontpg.-24, pp. 1-14 2014.

* cited by examiner

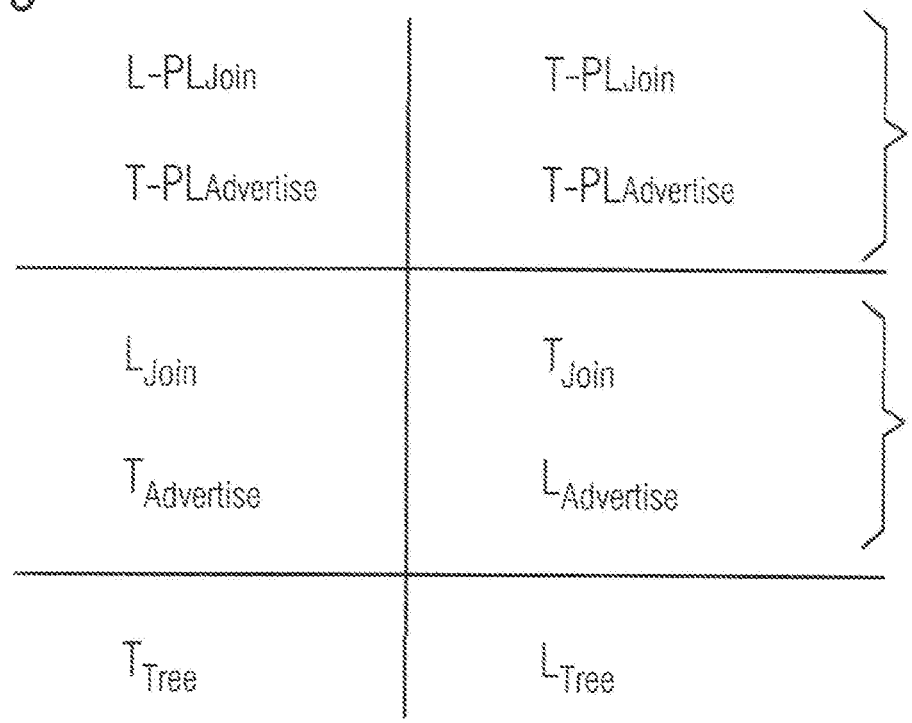
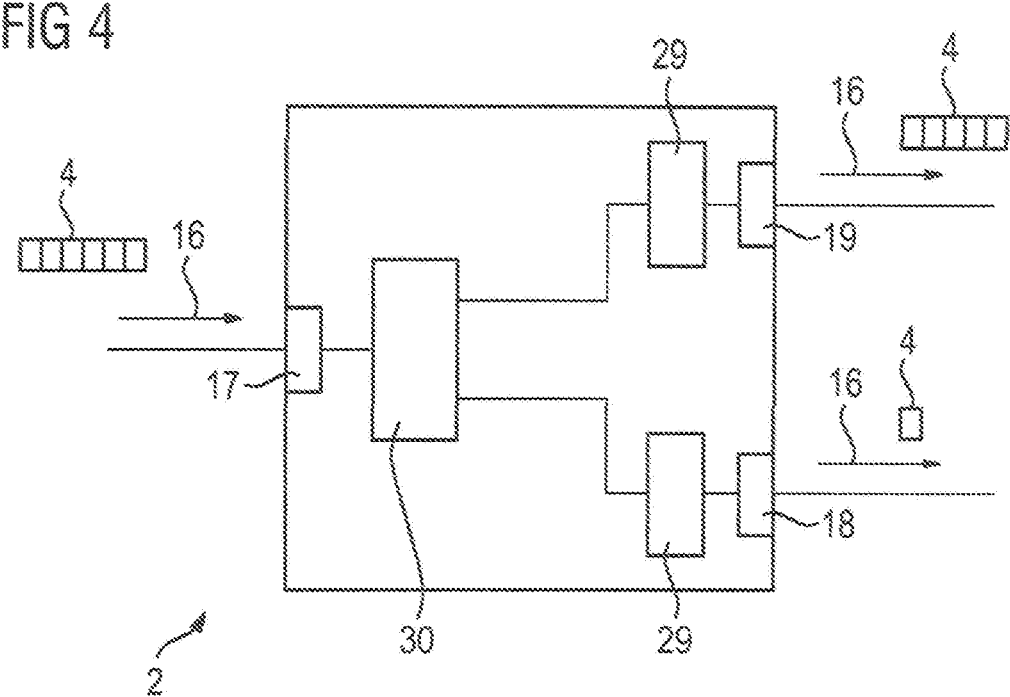

CONTROL METHOD, DEVICE, COMPUTER PROGRAM, COMPUTER READABLE MEDIUM AND METHOD FOR DATA COMMUNICATION IN AN INDUSTRIAL NETWORK

CROSS-REFERENCE TO RELATED APPLICATIONS

This is a U.S. national stage of application No. PCT/EP2019/051504 filed 22 Jan. 2019. Priority is claimed on European Application Nos. 18154319.0 filed 31 Jan. 2018 and 18181209.0 filed 2 Jul. 2018, the content of which are incorporated herein by reference in their entirety.

FIELD OF THE INVENTION

The invention relates to a control method, an apparatus, a computer program, a computer-readable medium and a method for data communication via stream in an in particular industrial network having one or more nodes, in particular switches and/or bridges, where for data transmission between stream users via one or more nodes of the network, resources are reserved at the one or more nodes using a reservation protocol and data is then transmitted via a stream.

DESCRIPTION OF THE RELATED ART

The "PROFINET System. Description", Version 31.102014 with order number 4132, published by the Profinet User Organization describes methods for data transmissions via streams.

US 2017/0331719 A1 also discloses data transmission via streams in time-critical networks.

Distributed industrial control applications require a guaranteed quality of service (QoS) in the communication network that interconnects the end stations so that time-sensitive tasks as well as non-real-time-relevant data traffic can be handled by the network. The end stations can be, for example, programmable logic controllers (PLCs), devices or protection equipment.

Each application in the network involving time-sensitive data traffic between end stations can be registered and reserved in order to obtain, from the network, guarantees for lossless real-time transfer of data frames and punctual delivery. For this purpose, the network must verify the availability of network resources (e.g., address table entries, frame buffers, transmit time slices) and allocate resources where available, this for each real-time data flow, and must provide access for real-time data traffic.

The control information concerning registrations, reservations and forwarding information for each real-time data flow must be stored within the network. The status of each reservation must be maintained. With an increasing number of end stations and their real time data traffic in the same network, the amount of network control information increases accordingly. At the same time, the storage and processing capacity of network nodes such as bridges or switches is limited.

Another problem is that of providing all the information from all the end stations in a timely manner. In industrial control applications, a single programmable logic controller (PLC) is generally connected to a large number of I/O devices that require real-time data interchange. The "makespan" of the sampled I/O device data that is to be transmitted from a number of I/O devices to a PLC must be minimized. The latest data frame of an input sample cycle that is to be processed by the PLC, or of an output update cycle that is received by an output device, determines the quality of the control loop. The Institute of Electrical and Electronics Engineer (IEEE) 802.1 TSN task group defines extensions to the Ethernet Standard IEEE802.1/.3 for a converged time-sensitive network (TSN). Based on the previous work of the Audio Video Bridging (AVB) task group, the quality of service for real-time data flows is being improved still further as far as the guaranteed latency is concerned. However, the status for each real-time data flow must continue to be maintained in the network.

"Multiple listeners per stream" "was introduced into AVB in order to reduce the number of real-time data flows (IEEE802 calls this "stream") from a source (talker) to a plurality of destinations (listeners). Transmitting data from a source to a plurality of destinations is the typical audio video (AV) application, specifically for the distribution of audio data from a single source to a plurality of loudspeakers.

The reservation model of AVB/TSN "multiple stream reservation protocol" (MSRP) supports a plurality of listeners. Here, following an outgoing "talker advertise" message for a stream from the source, a plurality of "listener join" reservations can be made, resulting in a single stream control information entry. The forwarding of the one talker to its listeners proceeds along an individual tree whose root is represented by the talker, with only a single forwarding entry being required in the network nodes for all the stream listeners. A single Ethernet frame is distributed by the one talker over the network to the plurality of listeners. The data is packed into a frame and distributed to each listener, each link being used no more than once.

In the context of industrial automation, this model could be used to reduce the number of streams from a PLC representing the talker to a plurality of I/O devices representing the listeners. The data for all the listening, i.e., receiving I/O devices can be transferred from the transmitting ("talking") PLC using a single stream. The number of streams in the network and therefore the amount of control information is then significantly reduced compared to setting up a separate stream for receiving data from the PLC for each I/O device.

However, depending on the amount of data of the individual I/O devices, the disadvantage of the simplified control information can be more excessive use of network bandwidth, as individual I/O devices require only a subset of the information of the frame transmitted via stream.

As a closed control loop also requires a return channel from each I/O device to the PLC, a large number of frames must also be transmitted to the PLC. Well-formed Ethernet frames require that 64+ octets are transmitted even if the I/O device hosts only a few bits of input information. This results in a large number of streams, each having a small frame which contains the required information.

Packing only a small number of input/output bytes into a 64+ octet Ethernet data frame causes an overhead, resulting in additional transfer delays with a negative effect on the makespan.

The applicant is aware that, to reduce the makespan, specialized real-time Ethernet solutions such as EtherCAT and PROFINET IRT exist for packing I/O data from different devices into a single frame which is also known as a summation frame. However, these specialized solutions have their limitations. On the one hand, they are application-specific, in particular limited so packed transport of specific fieldbus I/O data. EtherCAT is based on a logical ring topology independently of the physical network topology.

This can result in the simultaneous forwarding of frames being prevented at branches, particularly in star topologies. This leads to increased latency because of serialization.

PROFINET IRT supports a summation frame. However, the use of this option is limited to time-scheduled PROFINET IRT in linear and comb topology.

SUMMARY OF THE INVENTION

Proceeding therefrom, it is an object of the present invention to provide an apparatus and method that allow data to be communicated with acceptable cost/complexity particularly in an industrial network without being limited to specific applications, particular topologies and/or other aspects. The object of the present invention is also to specify an apparatus for carrying out such a method.

This an over objects and advantage are achieved in accordance with the invention by a method via which, for transmission of data from a transmitter to a plurality of receivers, the transmitter transmits a data frame containing a plurality of data subsets, and at least one data subset is filtered out of the data frame at least one output port of at least one node, and/or via which, for transmission of data from a plurality of transmitters to a receiver, the receiver receives a data frame containing a plurality of data subsets originating from different transmitters.

In accordance with the invention, a combination of stream reservation that is preferably based on the "multiple listeners per talker" model and/or the "multiple talkers per listener" model for real-time flow reservation as described in the European patent application with file number EP 18154319.0, the content of which incorporated herein in its entirety, and a summation frame principle as used in similar form for PROFINET IRT.

The data originating from in particular a single transmitter and intended for different receivers and/or the data originating from a plurality of transmitters and intended for in particular a single receiver can be transmitted in a data frame via a stream. For this purpose, it is inventively provided that data frames are transmitted that contain data subsets that originate from different transmitters and in particular are combined along the network paths, or are intended for different receivers, and are distributed in particular over different output ports at one or more nodes.

The node(s) can preferably be TSN-capable nodes, in particular TSN-capable switches and/or bridges.

Based on the term "payload" for the useful data of a frame, the data subsets that the data frame inventively contains can also be termed "paylets".

In a particularly preferred embodiment, each data subset comprises a data subset ID and/or an indication of the length of the data subset as well as the payload associated with the data subset. The data subset ID makes it possible to identify the transmitter from which the relevant data subset originates or the receiver for which it is intended. The length indication is particularly used for administrative purposes to define the start of a subsequent data subset in the payload. In the case of a defined fixed length for all the data subsets contained in the payload, the length indication can also be dispensed with.

The inventive introduction of data subsets makes it possible to combine information from different sources or for different destinations into a frame that particularly increases in size along network paths in the direction of the single receiver or can reduce in size along network paths in the direction of the plurality of receivers. Accordingly, it is provided in particular that the size of a data frame is changed at least one node so tat the size of the data frame at an input port of the node is different from the size of the data frame at least one output port of the node. This can apply to data frames that are sent by the one transmitter to the plurality of receivers, and/or to data frames that are transmitted by the plurality of transmitters to the one receiver.

With the inventive use of data frames comprising a plurality of data subsets or paylets, network performance is significantly improved by reducing the overhead and avoiding padding. The use of bandwidth and/or of other resources (particularly of storage in the nodes) is optimized. The number of real-time flows can be reduced. In particular, the number of filtering database entries in the nodes is reduced. The scalability is greatly improved, as in particular more end stations, such as sensors and/or actuators, can be supported in a network. Another considerable advantage of the approach in accordance with the invention is that it is completely independent of a given network topology. The disadvantages of being limited to a particular topology are therefore completely eliminated. Automatic communication configuration occurs using an improved real-time flow reservation protocol. This considerably simplifies communication function configuration.

For data transmission from a transmitter to a plurality of receivers, it is preferable that filtering of an least one data subset from a data frame occurs at least one node where the data frame is forwarded via at least two output ports. The data frame can thus be transmitted with different data subsets in the direction of different receivers.

In addition, the filtering of data subsets at least one node preferably occurs such that least one data subset that is filtered out at an output port of a node is forwarded at least one other output port of that node. It can also be provided that from an incoming data frame the data subsets are distributed or divided over two or more output ports, in particular such that no data subset is forwarded via two output ports of the node.

In an embodiment, for data transmission from the plurality of transmitters to the one receiver, data frames with different data subsets arrive at least one node on two or more input ports, and the data subsets originating from two or more input ports are in particular combined (merged) and a data frame containing the merged data subsets is preferably forwarded via at least one, in particular just one output port of that node. In accordance with the present embodiment, data subsets destined for a receiver that originate from different transmitters are merged in at least one, in particular in a plurality of nodes lying between the receivers and the transmitter, which can be implemented by a "data subset merge function" in the nodes.

The functionality for the filtering (in particular for data transmission from a transmitter to a plurality of receivers) and/or the merging (in particular for data transmission from a plurality of transmitters to a receiver) of data subsets can be incorporated e.g. into the existing IEEE802.1 node or bridging model by setting up a functional block for data subset handling on the egress side. The egress side is to be understood in a per se known manner as the side of a node at which data leaves the node.

In another embodiment of the method in accordance with the invention, data frames for data transmission from the one transmitter to the plurality of receivers include a header with a designated address. Alternatively or in addition, data frames for data transmission from the plurality of transmitters to the one receiver include a header with a designated address. The header can also have a destination address and possibly other information. The header of a data frame is generally followed by the useful data of the network layer packet, also known as the payload. In particular, the payload area of the data frame is inventively subdivided into data subsets which originate from different transmitters or are intended for different receivers. The useful data area, i.e., the payload, which is inventively subdivided into one or more data subsets ("paylets") can in particular range from 46 to 1500 bytes.

In addition, data is transmitted from the one transmitter to the plurality of receivers via data frames that have the same designated address for the stream and in particular the same priority and/or VLAN ID and/or the same EtherType in their headers. With particular preference the data frames have identical headers. Alternatively or in addition, data is similarly transmitted from the plurality of transmitters to the one receiver via data frames which have the same designated address for the stream and in particular the same priority and/or VLAN ID and/or the same EtherType in their headers. With particular preference, they have identical headers.

For the transmission of data from the one transmitter to the plurality of receivers, a data frame is (cyclically) sent out and in particular forwarded at least one node via two or more output ports so that, after the at least one node, a data frame is transmitted on at least two network paths in each case. The header of the two or more data frames is then preferably identical on the two or more network paths leading to different receivers, and is characterized by at least the same designated address and/or VLAN priority and/or the same EtherType.

For the transmission of data from a plurality of transmitters to a receiver, a data frame is sent (cyclically) from each of the plurality of transmitters in the direction of the receiver, where with particular preference the headers of all the data frames going out from the different transmitters and going via different network path sections (links) then contain the same designated address and/or VLAN priority and/or the same EtherType, the headers in particular being identical. On at least one link, the data frame contains less than the sum of all the individual frames, as the paylets from a plurality of data frames have been merged in a payload of at least one data frame.

In a per se known manner, a checksum, e.g., a frame check sequence (FCS) or a cyclic redundancy check (CRC) is provided at the end of the data frames. In addition, a preamble can be provided at the start of the frame, possibly even before the destination and/or source address.

To obtain a protected connection, prior to actual transmission of the data, resources are reserved in each case in a per se known manner in the node(s) between the stream users involved in the data interchange, this being possible using a reservation protocol. By using a reservation protocol for the real-time flow, the complex configuration is performed automatically in the network, where the existing topology is used. The resources can be, for example, address table entries, frame buffers, transmit time slices, bandwidth, jitter, and/or latency.

Data is preferably transmitted from the one transmitter to the plurality of receivers via a single stream, and/or data is preferably transmitted from the plurality of transmitters to the one receiver via a single stream. Whether a single stream for the one direction and/or a single stream for the other direction is present is evident in particular from the fact that (for each direction) just one stream ID is present and a plurality of transmitters are transmitting data to a receiver via a stream having the one ID and/or a plurality of receivers are receiving data from a transmitter via a stream having the one ID.

In order to allow real-time data communication of data subsets/paylets in frames via stream, an enhanced reservation protocol is preferably used, where an enhanced reservation protocol is to be understood in particular as one which corresponds to an already known, in particular standardized reservation protocol that has been extended to include one or more data objects or attributes.

Extending the reservation mechanism in particular enables the inventively provided data subset or paylet mechanism of the data plane to be configured automatically.

Examples of known standardized reservation protocols that can be used in particular in extended form as part of the method according to the invention are the stream reservation protocol (SRP) or the multiple stream registration protocol (MSRP) and/or the resource reservation protocol (RSVP). SRP represents the known amendment or enhancement of the IEEE802.1Q standard which has been standardized separately as IEEE802.1Qat.

One or more new attributes or data objects can be introduced into existing standardized flow reservation protocols without the fundamental principle of real-time flow reservation needing to be changed.

Whereas in particular the multiple stream registration protocol (MSRP), preferably in extended form, can be used for the exchange of data from a transmitter to a plurality of receivers, in particular the "multiple talkers per listener" model from the above-mentioned EP 18154319.0, again in particular in extended form, is accessed for data transmission from a plurality of receivers to a transmitter.

According to the application with file number EP 18154319.0, in order to make "multiple talkers per listener" possible, with "listener advertise" a new attribute or data object is introduced that can be used as part of an in particular already known standardized reservation model. If a comparison is to be drawn with the standardized protocols, then the "listener advertise" data object corresponds to the "talker advertise" for the already known case of data transfer from a "transmitter/talker" constituting the source to one or more "receivers/listeners" constituting the receivers via stream.

The difference with respect to multiple listeners per talker is that an advertisement is not issued by a transmitter but by a receiver that wishes to receive data via a stream.

With the novel reservation which allows "multiple talkers per listener", the stream is advertised in particular along a network tree whose origin or root is constituted by the one transmitter/talker and that is defined in particular by the totality of the network paths via which data proceeds to the plurality of receivers/listeners.

For real-time data transfer from a plurality of transmitters to a receiver, the disclosed embodiments of the present invention preferably makes use of the new type of reservation allowing "multiple talkers per listener" in combination with data transmission via data frames having a plurality of data subsets originating from different transmitters/talkers.

An example of data transfer of this kind could be the real-time transmission of the sensor values of a plurality of sensors of an automation system to the PLC of the automation system.

For the reverse direction, in particular the data transmission of control values, determined based on the sensor values, from the PLC to the plurality of actuators of the automation system, the multiple stream registration protocol (MSRP), in particular in extended form, can be used, this again in combination with data transmission via a single data frame containing a plurality of data subsets which are then designated for different receivers.

With particular preference, both data transmission from a transmitter to a plurality of receivers, in particular from a PLC to a plurality of actuators, and data transmission from a plurality of transmitters to a receiver, in particular from a plurality of sensors to preferably the same PLC, occurs based on the method in accordance with disclosed embodiments of the invention.

In another embodiment of the method in accordance with the invention, for data transmission from the one transmitter to the plurality of receivers, at least one talker data subset advertise message is disseminated in the network, in particular is transmitted to plurality of, preferably all, the nodes in the network.

With particular preference, the talker data subset advertise message constitutes an attribute or data object that extends the reservation protocol used for reservation. In particular, the "multiple stream reservation protocol" (MSRP) can be used which is then extended to include at least the data object "talker data subset advertise", and preferably other data objects.

Alternatively or in addition, for data transmission from the plurality of transmitters to the one receiver, a listener data subset advertise message is disseminated in the network, in particular is transmitted to a plurality of, preferably all, the nodes in the network.

With particular preference, the listener data subset advertise message constitutes an attribute or data object which extends the reservation protocol used for reservation. For example, the reservation model allowing "multiple talkers per listener" according to application file number EP 18 15 4319 can be used, which is then extended to include at least the data object "listener data subset advertise".

In addition, for data transmission from the one transmitter to the plurality of receivers, a listener data subset join message is transmitted by one or more receivers wishing to receive a data subset from the one transmitter via the stream, and for this purpose a listener data subset join reservation is made an the nodes on the network path between the transmitter and the respective receiver.

Alternatively or in addition, for data transmission from the plurality of transmitters to the one receiver, a talker data subset join message is transmitted in each case from one or more transmitters wishing to transfer at least one data subset to the one receiver via the stream, and a talker data subset join reservation is made at the nodes on the network path between the respective transmitter and the receiver.

With the listener data subset join message, a listener can log on to receive one or more data subsets from a data frame. With the talker data subset join message, a talker can log on to transmit one or more data subsets to a receiver.

In another embodiment, the respective listener data subset join message contains a stream ID and/or a data subset ID and/or a reservation status. Alternatively or in addition, the respective talker data subset join message contains a stream ID and/or a data subset ID and/or a reservation status.

Similarly to the corresponding advertise messages, the talker data subset join message and/or the listener data subset join message can constitute attributes or data objects which extend the reservation protocol used.

The data subset data objects receive the data necessary for identifying the data subsets/paylets in the payload. This is in particular the paylet ID and the paylet length. As the paylets constitute an integral part of the payload of a stream, the stream ID is required for allocation. In the case of known data objects (talker advertise, listener join and the talker loin and listener advertise introduced in the European patent application with file number EP 18154319.0), allocation has hitherto occurred via the stream ID. The data objects can be used to supplement the known talker and listener data objects, or can be used as a complete alternative in conjunction with the general stream data present in the data objects.

In another advantageous embodiment of the method in accordance with the invention, for data transmission from the plurality of transmitters to the one receiver, at least one node, in particular at a plurality of nodes, a reservation status of a first port in the direction of one or more transmitters and a reservation status of a second port in the direction of one or more other transmitters are combined, and in particular the combined reservation status is forwarded via a port in the direction of the receiver. This corresponds to the procedure that is already known from the European patent application with file number EP 18154319.0.

With complete similarity, for data transmission from a transmitter to a plurality of receivers, at least one node, in particular at a plurality of nodes, a reservation status of a first port in the direction of one or more receivers and a reservation status of a second port in the direction of one or more other receivers are combined, and in particular the combined reservation status is forwarded via a port in the direction of the transmitter. For data transmission from a transmitter to a plurality of receivers, in accordance with the presently contemplated embodiment, the reservation statuses are forwarded in the direction of the transmitter/talker in the manner already known from standardized reservation protocols.

In another preferred embodiment of the method in accordance with the invention, for data transmission from the one transmitter to the plurality of receivers, in particular using the Rapid Spanning Tree Protocol, the network tree is determined that is formed by the network paths via which the one transmitter is linked to the receivers.

Alternatively or in addition, for data transmission from the plurality of transmitters to the one receiver, in particular using the Rapid Spanning Tree Protocol, the network tree is determined which is formed by the network paths via which the plurality of transmitters are linked to the one receiver.

The network tree determined for the one and/or other direction then preferably constitutes an attribute or data object which extends a reservation protocol used.

It is also an object of the invention to provide a control method for an industrial technical process or a vehicle whereby, between at least two components of a control system, in particular between one or more sensors of an industrial automation system or of a vehicle as transmitters and a preferably a single controller, in particular a PLC of an industrial automation system or of a vehicle as receiver, data for carrying out a data communication method according to the invention is exchanged and the industrial technical process or the vehicle are controlled on the basis of the exchanged data.

It is a further object of the invention to provide an apparatus, comprising at least one, preferably a plurality of nodes, in particular bridges and/or switches, and a plurality of end stations each constituting a transmitter, in particular sensors, and a device constituting a receiver, in particular a controller of an industrial automation system or of a vehicle, a plurality of end stations each constituting a receiver, in particular actuators, and a device constituting a transmitter, in particular a controller of an industrial automation system or of a vehicle, where the apparatus performs the method in accordance with the disclosed embodiments of the invention for data communication or the control method in accordance with the invention is implemented or set up.

The apparatus in accordance with the invention form part of a control system for an industrial technical process which then constitutes another subject matter of the present invention.

It is also an object of the invention to provide a computer program having program code means for performing the data communication method in accordance with disclosed embodiments of the invention or the control method in accordance with the invention.

It is a further object of the invention to provide a computer-readable medium containing instructions which, when executed on at least one computer, cause the at least one computer to perform the steps of the data communication method in accordance with the disclosed embodiments of the invention or of the control method in accordance with the invention.

The computer-readable medium can be, for example, a CD-ROM or DVD or a USE or flash memory. It should be noted that a computer-readable medium is to be understood not solely as a physical medium but can also take the form of a data stream, for example, and/or of a signal representing a data stream.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention will emerge from the following description of an embodiment of the method of the present invention and with reference to the accompanying drawings in which:

FIG. 3 shows an overview with data objects of the reservation protocols in accordance with the invention;

FIG. 4 shows a purely schematic representation of a bridge at which data subsets are distributed from an input port to two output ports (filtering) in accordance with the invention;

DETAILED DESCRIPTION OF THE EXEMPLARY EMBODIMENTS

Figure 1:
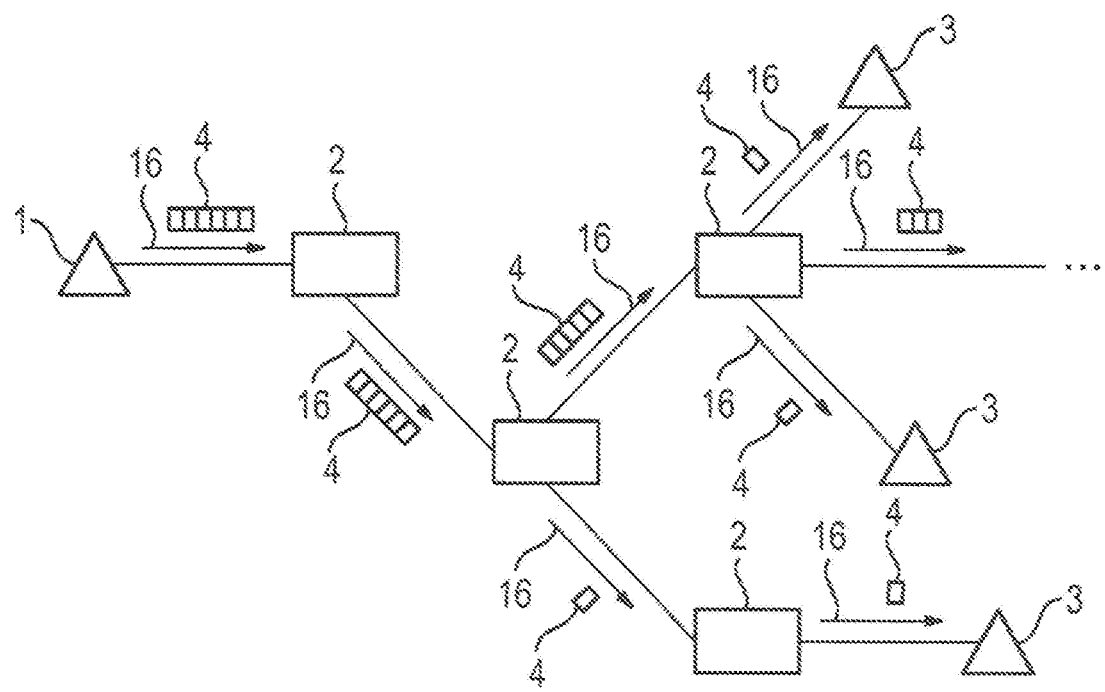
FIG. 1 shows a schematic partial view of an industrial network to illustrate the case of a transmitter transferring data to a plurality of receivers via a stream in accordance with the invention.

FIG. 1 shows a purely schematic partial view of an Ethernet-based industrial network. Specifically shown is an end station that constitutes a transmitter/talker 1 and which is connected via a plurality of bridges 2, of which only four are shown in FIG. 1, to a plurality of other end stations each constituting a receiver/listener 3. Only three of the receivers 3 are depicted in FIG. 1. The three dots on the right-hand side of FIG. 1 are intended to indicate that after the bridge 2 (top right) other bridges 2 and end stations (may) follow.

As can be seen from FIG. 1 the Ethernet-based network comprising the plurality of bridges 2 is characterized by a tree topology in the example shown. Self-evidently, another network topology known from the prior art, e.g., a linear, star or ring topology, can also be provided.

Here, the end station constituting the transmitter can be a programmable logic controller (PLC) 1 of an industrial automation system and the end stations constituting the receivers are actuators 3 of the automation system that require control signals cyclically from the PLC 1 in order to act cyclically on the industrial technical process.

The control signals are transmitted from the PLC 1 to the actuators 3 via the Ethernet-based network. The control signals are communicated by the PLC 1 to the actuators 3 via data frames 4 that are streamed across the network and that comprise a plurality of data subsets 11 for the plurality of receivers 3.

Figure 2:
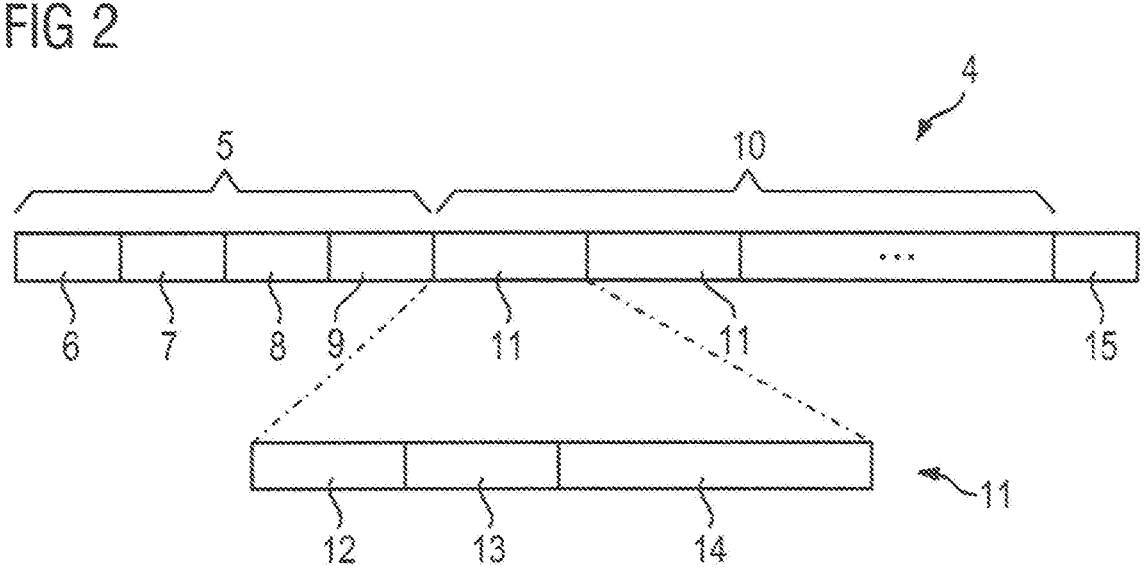
FIG. 2 shows a purely schematic representation of a data frame comprising a plurality of data subsets in accordance with the invention.

In FIG. 1 the data frames 4 are indicated purely schematically at different positions in the network by block diagram elements provided with the reference character 4. Likewise, FIG. 2 shows a purely schematic enlarged representation of a data frame 4 as an example of the structure of the data frames 4. The frames 4 specifically comprise a header 5 having a designated stream address 6, a destination address 7, a virtual local area network (VLAN) tag 8 per IEEE802.1 Q with a priority and the VLAN ID and an ET (EtherType) 9. The header 5 is followed by an area 10 containing the payload as in the case of the already known data frames, and which is inventively subdivided into a plurality of data subsets 11, specifically six in the exemplary embodiment described here. In FIG. 2, only two of the six data subsets 11 are shown and the others are indicated by " . . . ". Self-evidently, a different number of data subsets 11 can be provided, depending on the particular application.

As shown in FIG. 2 for only one of the data subsets 11 by way of example, each data subset 11 comprises a data subset ID 12, a length indication 13 which specifies the length of the respective data subset 11, and the payload 14 of the respective data subset 11. The data subset ID makes it possible to identify the receiver(s) 3 for which the respective data subset 11 is intended. The length indication 13 makes it possible to determine the start of the next data subset 11 in each case.

Lastly, at the end of the data frame 4 is a CRC 15 for a cyclic redundancy check as in already known data frames.

The data frame 4 having six data subsets 11 is transmitted cyclically by the one transmitter 1 to a plurality of actuators 3, specifically six in this case. In FIG. 1, the data transmission direction is indicated by arrows 16.

Frame forwarding occurs via a protected connection, i.e., a "stream". Data communication via a stream, which is known, e.g., from the AVB and TSN standard (TSN stands for Time Sensitive Networking), ensures in particular that a predefined latency time that can vary from stream to stream, and in particular depends on the respective application, is maintained. This ensures that control signals reach the actuators 3 within a predetermined maximum latency time, i.e., a maximum latency time elapses from the injection of the data into the network on the part of the PLC 1 to the arrival of the data at the actuators 3. Thus, for example, in particular real-time-critical communication between the PLC 1 and the actuators 3 can be ensured.

Here, a stream as defined, e.g., by the Audio/Video Bridging (AVB) task group and in particular by the TSN task group in the international standard IEE802.1 is set up using a stream reservation protocol (in this case, e.g., Stream Reservation Protocol SRP or the extension MSRP), thereby enabling a stream between a transmitter and a receiver or also a stream between a transmitter 1 and a plurality of receivers 3 to be supported. The latter configuration noticeably corresponds to that in FIG. 1, wherein then in particular the Multiple Stream Registration Protocol (MSRP) for resource reservation in a multiple listener per talker configuration can be used.

For setting up a stream between the PLC 1 and the actuators 3, reservation of resources occurs—in complete similarity with the procedure already known from the prior art—at each node 2 that forwards the data frame 4, where the MSRP in extended form is used for the reservation to enable automatic configuration of the data level data subset or paylet mechanism.

The sequence is such that, in a first step of the exemplary embodiment described here, a talker data subset advertise message is issued by the transmitter, i.e., the PLC 1. With the talker data subset advertise, the PLC 1 advertises, in the network, the stream via which the data frame 4 containing the plurality of data subsets 11 is transmitted, and the characteristics of the stream are described. The PLC 1 specifies in particular a stream ID, a forwarding address and broadband information for the outbound data transfer. The respective ID and the length are notified for each stream for each data subset 11.

The advertisement of the stream is distributed no all the nodes, i.e., bridges 2 in chis case, in the network, where each bridge 2 then carries the information of the receive port, i.e., the port in the direction of the talker 1 via which the advertisement has arrived and the data will also arrive subsequently. As the data source is also designated as talker 1, this port is also designated as the talker port. The ports in the direction of the listener(s) are correspondingly designated as transmit or listener ports.

One or more listeners, in this case the actuators 3, log on to the stream offered by the PLC 1. To do so, the respective actuator 3 transmits a listener data subset join message containing information as to which data subset or possibly which data subsets the respective actuator 3 wishes to receive. For this purpose, the data subset ID together with the logon status is included in the listener data subset join message.

At the bridges 2 lying between the PLC 1 and the respective actuator 3, a reservation is made at the port in the direction of the actuator 3, i.e., the listener port according to the stream description specified by the PLC 1 constituting the talker, for all the reserved data subsets 11 for the actuators 3 located at the egress port, provided the available resources at the respective bridge 2 are sufficient. Each node 2 checks whether its internal resources are sufficient for the performance required as part of the stream to be set up (in particular in respect of data volume and data throughput). If this is the case, then the node 2 reserves these resources for the stream to be set up for the desired data subsets 11 and passes on a positive reservation status to the downstream bridge 2, or the last bridge to the transmitter 1.

The reservation enables each respective node 2 to make sure that it can provide the required performance during the subsequent data transfer. Herein lies the difference between streams and unprotected connections.

If insufficient resources are available, a negative reservation status is passed on.

The reservation starts at the bridge 2 nearest to the respective receiver/listener, i.e. actuator 3, and "propagates" along the respective network path to the data source/talker, i.e. the PLC 1. The reservation is based on the forwarding tree, also termed the talker tree (Ttree), which can be set up using the Rapid Spanning Tree Protocol (RSTP). At the bridges 2 that constitute branches, i.e., have to forward the data via two listener-side ports, merging of the incoming listener reservation statuses occurs for each data subset 11. This is implemented via the "status merge" function of the reservation protocol used. Here, a reservation protocol that has been extended to include the new data objects talker data subset advertise and listener data subset join is used for the reservation.

FIG. 3 provides an overview of, among other things, the new data objects talker data subset advertise T-$PL_{advertise}$ ("PL" for paylet which, as indicated above, is used synonymously with "data subset") and listener data subset join L-$PL_{Join}$, in each case in juxtaposition with the corresponding data objects from the already known standard, i.e., the talker advertise $T_{Advertise}$ and listener join $L_{Join}$. The lower brace indicates the real time flow registration reservation and the upper brace marks the data subset or paylet registration reservation per real-time flow.

Following a successful reservation, the data frame 4 containing the plurality of data subsets 11 is transmitted cyclically from the PLC 1 to the actuators 3.

Here, different data subsets 11 are forwarded at a plurality of nodes 2 via different output ports 18, 19 of the respective node 2, which is achieved via data subset filtering at the output ports. At a plurality of nodes 2, the size of the data frame 4 is changed so that the size of the data frame 4 at one input port 17 of the node 2 is different from the size of the data frame 4 at least one output port 18, 19 of the node 2. Specifically, at the first node 2 as seen from the PLC 1, the data frame 4 is forwarded as yet unchanged via only one output port of the bridge. However, at the next second bridge 2, as seen from the PLC 1, filtering of data subsets 11 occurs. Specifically, the data frame 4 arrives at the transmitter-side input port 17 (cf. FIG. 4) with all six data subsets 11, and is forwarded at one output port, i.e., receiver-side port 18, with different data subsets 11 from those at the other second output port 19 of the bridge 2. This is illustrated in FIG. 4—purely schematically—for a bridge 2. Whereas, at the lower output port 18 in FIG. 4, five of the six data subsets 11 are filtered out of the data frame 4 and the data frame 4 is therefore forwarded with only one data subset 11, at the upper output port 19 in FIG. 4 only the one data subset 11 allowed through at the lower port 18 is filtered and therefore the data subset(s) 11 that leave at the port 19 are not forwarded at the port 18 and vice versa. Two data frames 4 go out from this node 2 which, although they have identical headers 5, are different in respect of their data subsets 11.

At the lowest bridge 2 in FIG. 1, the incoming data frame 4 containing the one data subset 11 is forwarded via only one output port and reaches the receiver after it, i.e. actuator 4.

On the other hand, at the bridge 2 (top right) in FIG. 1, filtering again occurs, as after it there are in turn a plurality of actuators 4 that wish to receive different data subsets 11 of the incoming data frame 4. Specifically, as indicated schematically via the associated block diagram elements, four of the five incoming data subsets 11 to the input port are filtered out at the upper output port in FIG. 1 and at the lower output port in FIG. 1 and, in each case, four of the five data subsets 11 via the output port between the upper and the lower output port. Accordingly, a data frame 4 with one data subset 11 goes out at the upper and lower port in each case, where the data subsets 11 of the frames 4 from the upper and lower port are different, and a frame 4 goes out at the middle port with three—again different—data subsets 11 that are intended for three further actuators 3 that are not shown in FIG. 1 but are only indicated by " . . . ". The frames 4 after all three output ports of the node 2 have the same header 5.

As a result, in the example described only a single data subset 11 reaches each actuator 3. Different data is transmitted from a transmitter 1 to a plurality of receivers 3 via a single stream and data frames 4 containing a plurality of data subsets 11, the size of which reduces in the direction of the respective receiver.

Figure 5:
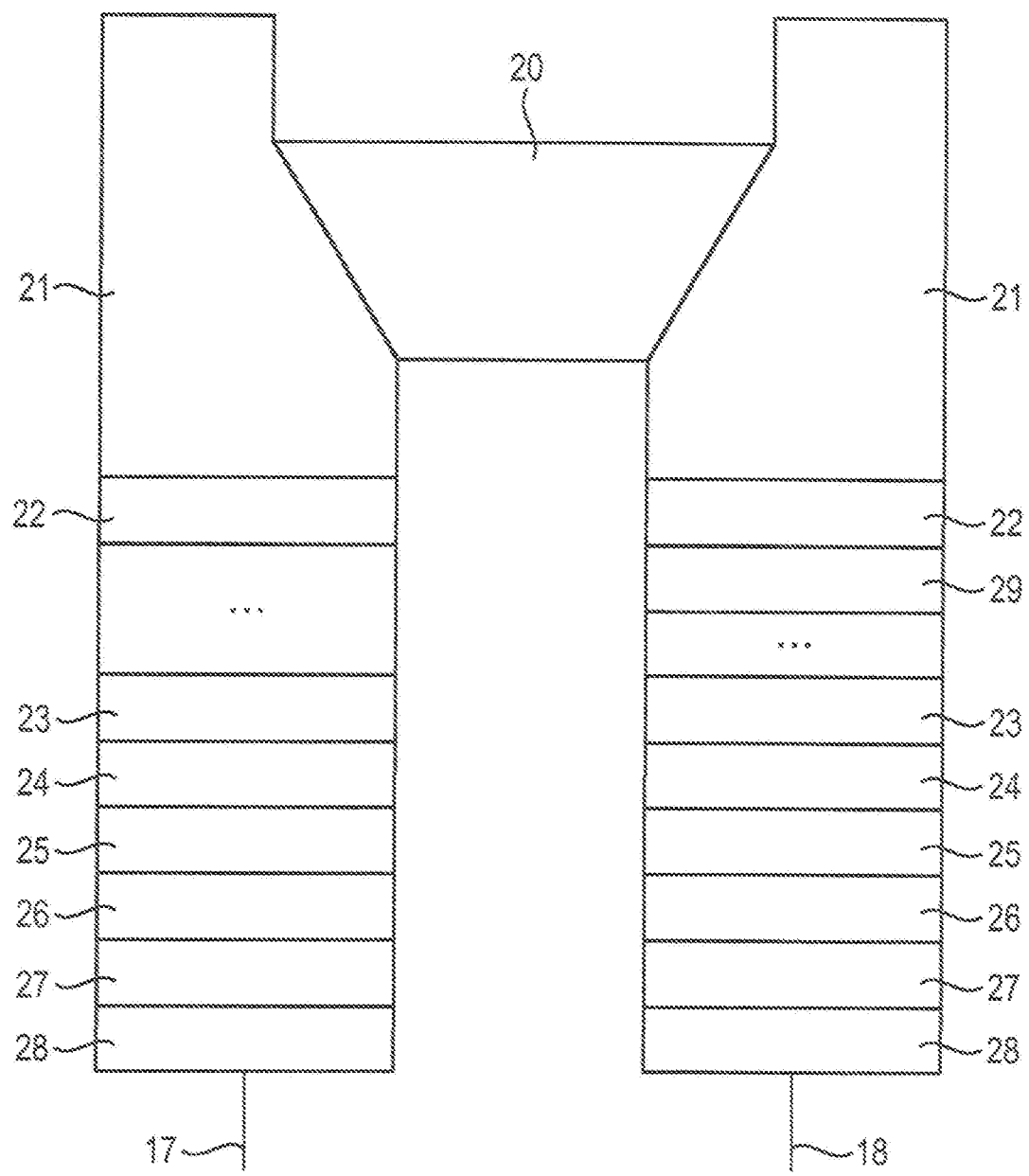
FIG. 5 shows a purely schematic representation for the simplified IEEE.802.2 bridge model with integrated data subset merging and filtering function in accordance with the invention.

In the example presented, the functionality for the filtering of data subsets 11 at the nodes 2 has been integrated into the existing IEEE802.1 node or bridging model by setting up a functional block for data subset handling on the egress side. This is illustrated—again purely schematically—in FIG. 5.

Here, in addition to an input port 17 and an output port 18, the following are shown: MAC relay entity 20 and, for both the ingress and egress side, MAC entities 21, stream classification/identification 22, sync recognition 23, MACsec 24, 802.3ah OAM 25, 802.3X pause 26, 802.3bf timestamping 27, PHI 28. The stream paylet filtering/merging 29 function can be seen to be provided on the egress side. The merging function will be discussed in greater detail below. The stream paylet filtering/merging function 29 is also represented schematically in FIG. 4 by a block diagram element. Shown in similarly schematic form is the MAC relay 30.

In addition to the situation shown in FIG. 1 according to which data, in this case control signals, is to be distributed from an end station to a plurality of further network users, there also arises—particularly in industrial applications—the reverse case, namely that data is to be communicated from two or more sources to a (common) destination. This is the case, for example, when, in an automation system, actual values acquired by a plurality of sensors 31 are to be transmitted in a real-time critical manner to a central controller which can again be a PLC 1.

Figure 6:
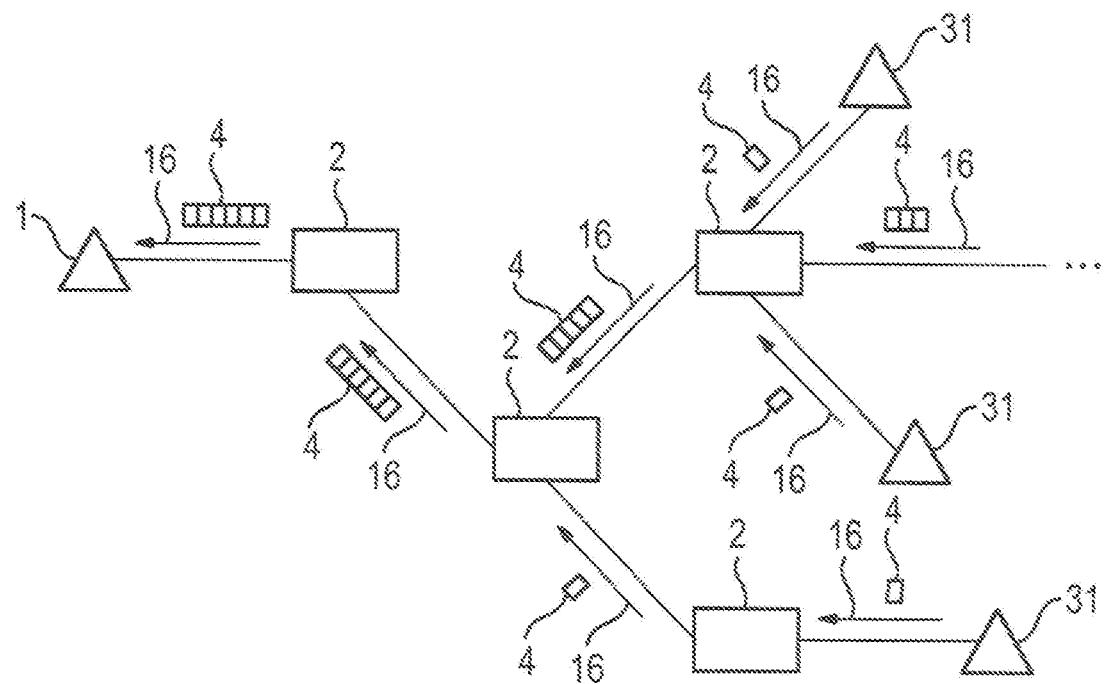
FIG. 6 shows a schematic partial view of an industrial network to illustrate the case of a receiver receiving data from a plurality of transmitters via a stream in accordance with the invention.

This situation illustrated in FIG. 6, which again shows a purely schematic partial representation of an Ethernet-based industrial network, where again an end station is constituted by the PLC 1 which now, however, represents the receiver/listener, and a plurality of transmitters/talkers are present, specifically a plurality of sensors 31 of which a total of three are visible in FIG. 6. It should be noted that the network topology is shown correspondingly in FIGS. 1 and 6, as here the actuators 3 visible in FIG. 1 and the sensors 31 visible in FIG. 6 are contained in an end station in each case, but this of course need not necessarily be the situation. The PLC 1 and the sensors 31 are accordingly likewise interconnected via a plurality or bridges 2 in the—purely optional—tree topology.

According to the prior art, for the transmission of actual values acquired by the sensors 31 to the PLC 1, a separate stream would have to be set up for each sensor 31 and this would involve a significantly higher network management and processing overhead compared to the situation according to FIG. 1.

To reduce the number of streams in the case that data is to be transmitted from a plurality of sources/transmitters 31 to a single destination/receiver 1, in the European patent application with file number EP 18 15 4319 a novel kind of reservation is described which allows a "multiple talkers per listener" configuration so that the plurality of sensors 31 can transmit data to the PLC 1 via just one stream using a stream ID.

This reservation mechanism is used here in combination with data transmission in data frames 4 having a plurality of data subsets 11 in the manner already described above for the other direction.

For the reservation, a listener data subset advertise message comprising a stream description and the therein requested data subsets 11 with the respective length and ID is issued for the stream by the receiver, i.e., the PLC 1, and the listener data subset advertise message is distributed in the network via the bridges 2 and transmitted to the sensors 31. With the listener data subset advertise message, the PLC 1 announces in the network that it wishes to receive data via a stream. It should be noted that the information that the sensors 31 can provide actual values for the PLC 1 has been provided by other means. This is likewise necessary in FIG. 1 according to the prior art and can occurs, e.g., in the industrial environment during programming of the PLC 1 and I/O modules.

After the PLC 1 has issued the listener data subset advertise and it has been distributed, a talker data subset join message is issued by each sensor 31 from which actual values acquired are to be transmitted to the PLC 1. In the exemplary illustrated embodiment, all the sensors 31 transmit a talker data subset join message. For each sensor 31, a talker data subset join reservation is made at the bridges 2 on the network path between the respective sensor 31 and the PLC 1. The talker data subset join message contains, among other things, a stream ID, a data subset ID and a reservation status.

In contrast to the scenario according to FIG. 1, resources are reserved in the bridges 2 from the respective talker, i.e., respective sensor 31, in the direction of the one listener 1, i.e., the PLC 1, and therefore in the same direction as the forwarding of the actual values from the sensors 31 to the PLC 1 which will occurs via the stream as a data frame 4 if the reservation at the bridges 2 has been successful. Similarly to FIG. 1, in FIG. 5 the direction of subsequent data transmission is indicated by arrows 16.

At the bridges 2 that constitute branches, i.e., where data can arrive via two talker-side ports, merging of the incoming talker data subset reservation statuses occur. Similarly to the procedure described in connection with FIG. 1, this is implemented via the "status merge" function of the reservation protocol used. Here a reservation protocol is used that has been extended to include the new data objects listener data subset advertise and talker data subset join, and makes use of the listener status merge function of known protocols that is already known for the receivers/listeners, as the actual reservation of resources at the node(s) can basically occurs in an identical or similar manner to the already known procedure with a transmitter talker and a plurality of receivers/listeners.

Departing from the prior art, the talker statuses in the direction of the listener tree are merged into a single receiver, i.e., the PLC 1.

Here, the listener tree, which is formed from the additional listener advertise data object of the extended reservation protocol used, is also determined using the Rapid Spanning Tree Protocol. The tree results from the stored port of the listener advertise.

An overview of the new data objects listener data subset advertise L-$PL_{Advertise}$/talker data subset join T-$PL_{Join}$ and the listener Tree $L_{Tree}$ resulting from the advertise are shown on the right-hand side of FIG. 3, in each case in juxtaposition with the corresponding data objects for the other direction according to FIG. 1.

Following a successful reservation, the data frame 4 is transmitted cyclically from the sensors 31 to the PLC 1.

The data is transmitted from a plurality of transmitters 31 to a receiver 1 via data frames 4 which have, at least one node 2, in this case at a plurality of nodes 2, a plurality of data subsets 11 originating from different transmitters 31.

It is again the case that, at a plurality of nodes 2, the size of the data frames 4 is changed, and the size of a data frame 4 at an input port 32, 33 of the node 2 is different from the size of the data frame 4 at least one output port 34 of the node 2.

Specifically, at a plurality of nodes 2, data frames 4 arrive at two or more input pores 32, 33 with different data subsets 11, and the data subsets 11 originating from one or more input ports 32, 33 are merged and a data frame 4 containing the merged data subsets 11 is forwarded at just one output port 34 of that node 2 (cf. FIG. 6).

According to FIG. 6, the respective data frame 4, when it is sent out from the respective sensor 31, contains in each case a data subset 11 that is schematically indicated in FIG. 6 by the block diagram element representing the frame 4 and having the smallest size immediately after the respective sensor 31. At the upper right-hand node 2 in FIG. 6, the data frames 4 from different transmitters 31 arrive via three input ports, with different data subsets 11 in each case, and these are combined using the stream paylet merging function 29 which, in the exemplary illustrated embodiment, like the stream paylet filtering function, has been incorporated into the existing IEEE802.1 node or bridging model in which a functional block 29 for data subset handling has been set up on the egress side (cf. FIG. 5 and the above description relating thereto).

At the node 2 at bottom right in FIG. 6, the incoming data frame 4 is passed on unchanged, specifically with the one data subset 11 arriving at the input port. Then, at the following node 2 in the direction of the PLC 1, data subsets 11 are again combined, specifically the five data subsets 11 coming from the upper sensors 31 are merged with the one data subset 11 from the lower sensor 31. The data frame 4 going out from the node 2 then accordingly comprises six data subsets 11, and is passed on unchanged at the next node 2 nearest to the PLC 1 and finally reaches the PLC 1.

Figure 7:
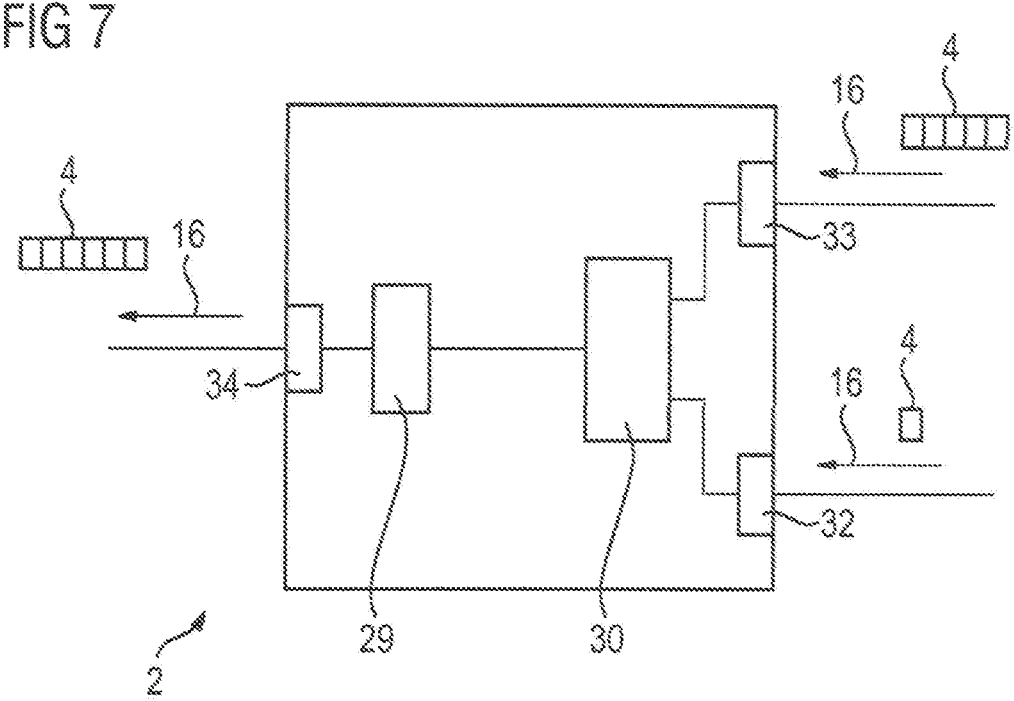
FIG. 7 shows a purely schematic representation of a bridge at which data subsets from two input ports are combined (merging)

By way of example, in FIG. 7 this is illustrated for this node 2 in a similar manner to FIG. 4, where the data frame 4 with five data subsets 11 arrives at the upper input port 33 in the figure and the data frame 4 with one data subset 11 at the lower one and the data subsets 11 are combined via the stream paylet filtering/merging function 29 and a data frame 4 containing all six data subsets 11 goes out at the output port 34 in the direction of the PLC 1.

As a result, the data coming from all the sensors 31 is transmitted via just one stream and data frames of increasing size in the direction of the one receiver, i.e., the PLC 1. The receiver, i.e., the PLC 1, receives a data frame 4 containing a plurality of data subsets 11 originating from different transmitters, in this case sensors 31.

The introduction and use of data subsets 11 makes it possible to combine the information from different sources or for different destinations in a frame 4. Network performance can be significantly improved by reducing the overhead and avoiding padding. The use of bandwidth and resources (particularly of storage in the nodes 2) is optimized. The number of real-time flows can be reduced. In particular, the number of filtering database entries in the nodes 2 is reduced. Scalability is greatly improved, as in particular more end stations such as sensors 31 and/or actuators 3 can be supported in a network. Another considerable advantage of the procedure in accordance with the invention is that it is completely independent of any given network topology. The disadvantage of being limited to a particular topology is therefore completely eliminated. Automatic communication configuration occurs using an enhanced real-time flow reservation protocol. This significantly simplifies communication function configuration.

The fact that the procedure in accordance with the invention enables the amount of data to be transported to be significantly reduced can also be illustrated by following purely exemplary calculation. Assuming that transmission of data from 1000 sensors 31 with 4 bytes of data to a PLC 1 is required, and a 1 GBit/s Ethernet network is available (with a minimum frame size of 64 bits and 12-bit inter-frame gap), the already know case of one frame per dataset results in a makespan of $1000*(64+12)*8*1$ ns=608 µs. On the other hand, if the datasets are merged in a frame 4, as provided by the invention, a makespan of only $4024*8*1$ ns=32.2 µs is obtained.

The industrial network comprising the bridges 2 and end stations 1, 3, 31 from FIGS. 1 and 6 is part of an exemplary embodiment of the apparatus in accordance with the invention for performing the method in accordance with the invention.

Figure 8:
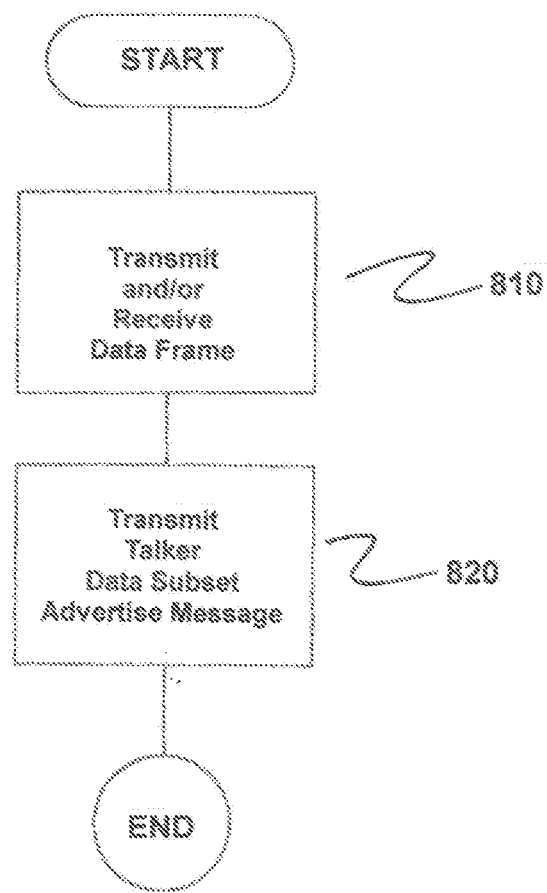
FIG. 8 is a flowchart of the method in accordance with the invention.

FIG. 8 is a flowchart of the method for data communication via stream in a network operating in according with a time sensitive network principle and comprising at least one node 2, where resources are reserved at the at least one node 2 utilizing a reservation protocol and data is then transmitted via stream for data transmission between stream users 1, 3, 31 via a plurality of nodes 2 of the network.

The method comprises either transmitting, by a transmitter 1, a data frame 4 containing a plurality of data subsets 11 intended for different receivers 3 to transmit data from the transmitter 1 to a plurality of receivers 3 and filtering out at least one output port 18, 19 of at least one node 2 at least one data subset 11 from the data frame 4 and/or receiving, by the receiver 1, the data frame 4 containing a plurality of data subsets 11 originating from different transmitters to transmit data from a plurality of transmitters 31 to a receiver 1, as indicated in step 810.

Next, at least one talker data subset advertise message is transmitted in the network to a plurality of nodes 2 in the network so as to transmit the data from a transmitter 1 to the plurality of receivers 3 and/or a listener data subset advertise message in the network is transmitted to a plurality of nodes 2 in the network to transmit the data from the plurality of receivers 31 to the one receiver 1, as indicated in step 820.

Although the invention has been illustrated and described in detail by the preferred exemplary embodiment, the invention is not limited by the examples disclosed and other variations will be apparent to persons skilled in the art without departing from the scope of protection sought for the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for data communication via streaming in a network comprising a plurality of nodes and operating in accordance with a time-sensitive networking protocol, the method comprising:
reserving resources for at least one node of the plurality of nodes associated with a steaming user by utilizing a reservation protocol;
transmitting data comprising frames, either from one transmitter to a plurality of receivers, or from a plurality of transmitters to one receiver, wherein the transmissions are performed via streaming between one or more streaming users connected to one or more nodes of the plurality of nodes;
wherein for data transmissions from one transmitter to the plurality of receivers, each transmitted data frame contains a plurality of data subsets, with each subset being intended for one or more of the plurality of receivers, and with at least one subset being filtered out of the data frame for at least one output port of one node of the plurality of nodes;
wherein for data transmissions from the plurality of transmitters to the one receiver, the receiver receives the data frame containing a plurality of data subsets originating from the plurality of transmitters;
wherein for data transmissions from one transmitter to the plurality of receivers, at least one talker data subset advertise message is transmitted to the plurality of nodes in the network;
wherein for data transmissions from the plurality of transmitters to the one receiver, a listener data subset advertise message is transmitted to the plurality of nodes in the network; and
wherein a size of the data frame forwarded to at least one node of the plurality of nodes is changed, such that the size of the data frame at an input port of the node is different from the size of the data frame at one or more output ports of the node.

2. The method as claimed in claim 1,
wherein in order to transmit the data from the plurality of transmitters to the one receiver, for at least one node of the plurality of nodes, data frames having different data subsets arrive at a plurality of input ports, and the data subsets coming from the plurality of the input ports are merged; and the data frame containing the merged data subsets is forwarded to at least one single output port of the one node of the plurality of nodes.

3. The method as claimed in claim 1, wherein the data is transmitted from the one transmitter to the plurality of receivers via a single stream or the data is transmitted from the plurality of transmitters to the one receiver via a single stream.

4. The method as claimed in claim 1, wherein each data subset comprises at least one of:
payload data and a data subset ID, and
an indication of a length of the data subset of the plurality of data subsets.

5. The method as claimed in claim 1,
wherein data frames for transmitting data from the one transmitter to the plurality of receivers contain a header with a designated address; and
wherein data frames for transmitting data from the plurality of transmitters to the one receiver contain the header with the designated address.

6. The method as claimed in claim 5, wherein
data is transmitted from the one transmitter to the plurality of receivers via the data frames with identical headers, all of which include at least one of: the same designated address, the same priority, the same VLAN ID and the same EtherType; and
data is transmitted from the plurality of transmitters to the one receiver via the data frames with the identical headers, all of which include at least one of: the same designated address, the same priority, the same VLAN ID and the same EtherType.

7. The method as claimed in one claim 1, wherein for reservation of resources for at least one node of the plurality of nodes, the at least one reservation protocol is utilized and is extended to include at least one data object.

8. The method as claimed in claim 7, wherein at least one of: the listener data subset advertise message, the talker data subset join message, and the talker data subset join reservation constitute the data objects extending the reservation protocol.

9. The method as claimed in claim 7, wherein the at least one network tree constitutes a data object extending the at least one reservation protocol.

10. The method as claimed in claim 1,
wherein when transmitting data from the one transmitter to the plurality of receivers, a listener data subset join message is sent from at least one of the plurality of receivers wishing to receive at least one of the data subsets from the one transmitter via the stream, and a listener data subset join reservation is made at each node on a network path between the transmitter and a respective receiver and
wherein when transmitting data from the plurality of transmitters to the one receiver, for each of the transmissions, a talker data subset join message is sent from the at least one transmitter of the plurality of transmitters, each wishing to transmit at least one of the data subsets to the one receiver via the stream, and a talker data subset join reservation is made at each node on the network path between a respective transmitter and the receiver.

11. The method as claimed in claim 10,
wherein the respective listener data subset join message comprises at least one of a stream ID, a data subset ID, and a reservation status; and
wherein the respective talker data subset join message comprises at least one of a stream ID, a data subset ID, and a reservation status.

12. The method as claimed in claim 11, wherein at least one of: the listener data subset advertise message, the taker data subset join message, and the taker data subset join reservation constitute the data objects extending the reservation protocol.

13. The method as claimed in claim 10, wherein at least one of: the listener data subset advertise message, the talker data subset join message, and the taker data subset join reservation constitute the data objects extending the reservation protocol.

14. The method as claimed in claim 1, wherein for transmitting data from the plurality of transmitters to the receiver, for at least the one node of the plurality of nodes, a reservation status of a first port toward at least one transmitter and a reservation status of a second port toward at least one transmitter are merged, and the merged reservation status is forwarded via a port toward the receiver.

15. The method as claimed in claim 1,
wherein when transmitting data from the one transmitter to the plurality of receivers in accordance with a Rapid Spanning Tree Protocol, a network tree is determined, which is formed by the network paths between the one transmitter and the receivers; and
wherein when transmitting data from the plurality of transmitters to the one receiver in accordance with the Rapid Spanning Tree Protocol, the network tree is determined, which is formed by the network paths between the plurality of transmitters and the one receiver.

16. The method as claimed in claim 15, wherein the at least one network tree constitutes a data object extending the at least one reservation protocol.

17. The method as claimed in claim 1,
wherein a control method for an industrial technical process or a vehicle is implemented; and
wherein data for performing the method is exchanged between at least two components of a control system and a single controller, and the industrial technical process or vehicle is controlled based on the data exchanged.

18. The method as claimed in claim 17,
wherein the at least two components of the control system comprise at least one sensor of one of an industrial automation system and a vehicle as transmitters; and
wherein the single controller comprises a PLC of either the industrial automation system or the vehicle as a receiver.

19. An apparatus comprising:
at least one of:
a plurality of nodes comprising:
at least one of bridges and switches,
a plurality of end stations, each constituting a transmitter, and
a device constituting a receiver comprising a controller of one of an industrial automation system and a vehicle;
a plurality of end stations, each constituting a receiver; and
a device constituting a transmitter forming the controller of one of the industrial automation system and the vehicle;
wherein data is exchanged between at least two components of a control system and a single controller, and one of an industrial technical process and vehicle is controlled based on the exchanged data;
wherein the apparatus is configured such that:
for data transmissions from one transmitter to a plurality of receivers, each transmitted data frame contains a plurality of data subsets, with each subset being intended for one or more of the plurality of receivers, and with at least one subset being filtered out of the data frame for at least one output port of one node of the plurality of nodes;
for data transmissions from a plurality of transmitters to one receiver, the receiver receives a data frame containing a plurality of data subsets originating from different transmitters;
for data transmissions from the transmitter to the plurality of receivers, at least one talker data subset advertise message is transmitted in the network to a plurality of nodes in the network; and
for data transmissions from the plurality of receivers to the one receiver, a listener data subset advertise message is transmitted in the network to a plurality of nodes in the network; and
wherein a size of the data frame forwarded to at least one node of the plurality of nodes is changed, such that the size of the data frame at an input port of the node is different from the size of the data frame at one or more output ports of the node.

* * * * *